United States Patent
Bittinger et al.

(10) Patent No.: US 8,801,103 B2
(45) Date of Patent: Aug. 12, 2014

(54) REAR VEHICLE SEAT AUTOMATIC HEAD REST SYSTEM

(75) Inventors: D. Scott Bittinger, Fenton, MI (US); Vincent Audet, Macomb, MI (US); Ravi Hosalli, Troy, MI (US); Johnathan Larner, Grand Blanc, MI (US); Travis D. Bechtel, Goodrich, MI (US); John Taylor, Fife Lake, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 187 days.

(21) Appl. No.: 13/447,341

(22) Filed: Apr. 16, 2012

(65) Prior Publication Data
US 2012/0261968 A1 Oct. 18, 2012

Related U.S. Application Data

(60) Provisional application No. 61/476,459, filed on Apr. 18, 2011.

(51) Int. Cl.
*B60N 2/48* (2006.01)
*B60N 2/02* (2006.01)

(52) U.S. Cl.
USPC ............................ 297/391; 297/409; 297/410

(58) Field of Classification Search
USPC ................... 297/409, 408, 216.12, 391, 410
See application file for complete search history.

(56) References Cited

U.S. PATENT DOCUMENTS

| | | | | |
|---|---|---|---|---|
| 2,886,097 A * | 5/1959 | Katz | | 297/112 |
| 3,065,029 A * | 11/1962 | Spound et al. | | 297/391 |
| 4,366,985 A * | 1/1983 | Leffler | | 297/409 |
| 5,006,771 A | 4/1991 | Ogasawara | | |
| 6,270,161 B1 * | 8/2001 | De Filippo | | 297/410 |
| 6,511,130 B2 * | 1/2003 | Dinkel et al. | | 297/410 |
| 6,659,547 B2 * | 12/2003 | Petersen | | 297/215.1 |
| 6,890,029 B2 * | 5/2005 | Svantesson | | 297/216.12 |
| 6,962,392 B2 * | 11/2005 | O'Connor | | 297/61 |
| 7,073,856 B2 * | 7/2006 | Akaike et al. | | 297/216.12 |
| 7,145,262 B2 | 12/2006 | Kikuchi et al. | | |
| 7,604,294 B2 * | 10/2009 | Jane Santamaria | | 297/250.1 |
| 7,862,110 B2 * | 1/2011 | Rogers | | 297/61 |
| 2004/0195872 A1 * | 10/2004 | Svantesson | | 297/216.12 |

FOREIGN PATENT DOCUMENTS

DE 3942407 A1 * 6/1991 ............... A47C 7/00

* cited by examiner

*Primary Examiner* — David R Dunn
*Assistant Examiner* — Tania Abraham
(74) *Attorney, Agent, or Firm* — Ralph A. Smith

(57) ABSTRACT

An extendible and retractable head rest system for a motor vehicle seat has a head rest coupled to a linkage and an actuator coupled to the linkage. The linkage includes an offset drive link that upon the actuator being actuated to extend the head rest system to an operative position, the linkage moves the head rest up and forward and upon the actuator being actuated to retract the head rest system to an inoperative position, the linkage moves the head rest back and down. In an aspect, the linkage kneels when the head rest reaches an upper position to move the head rest to a forward position.

6 Claims, 4 Drawing Sheets

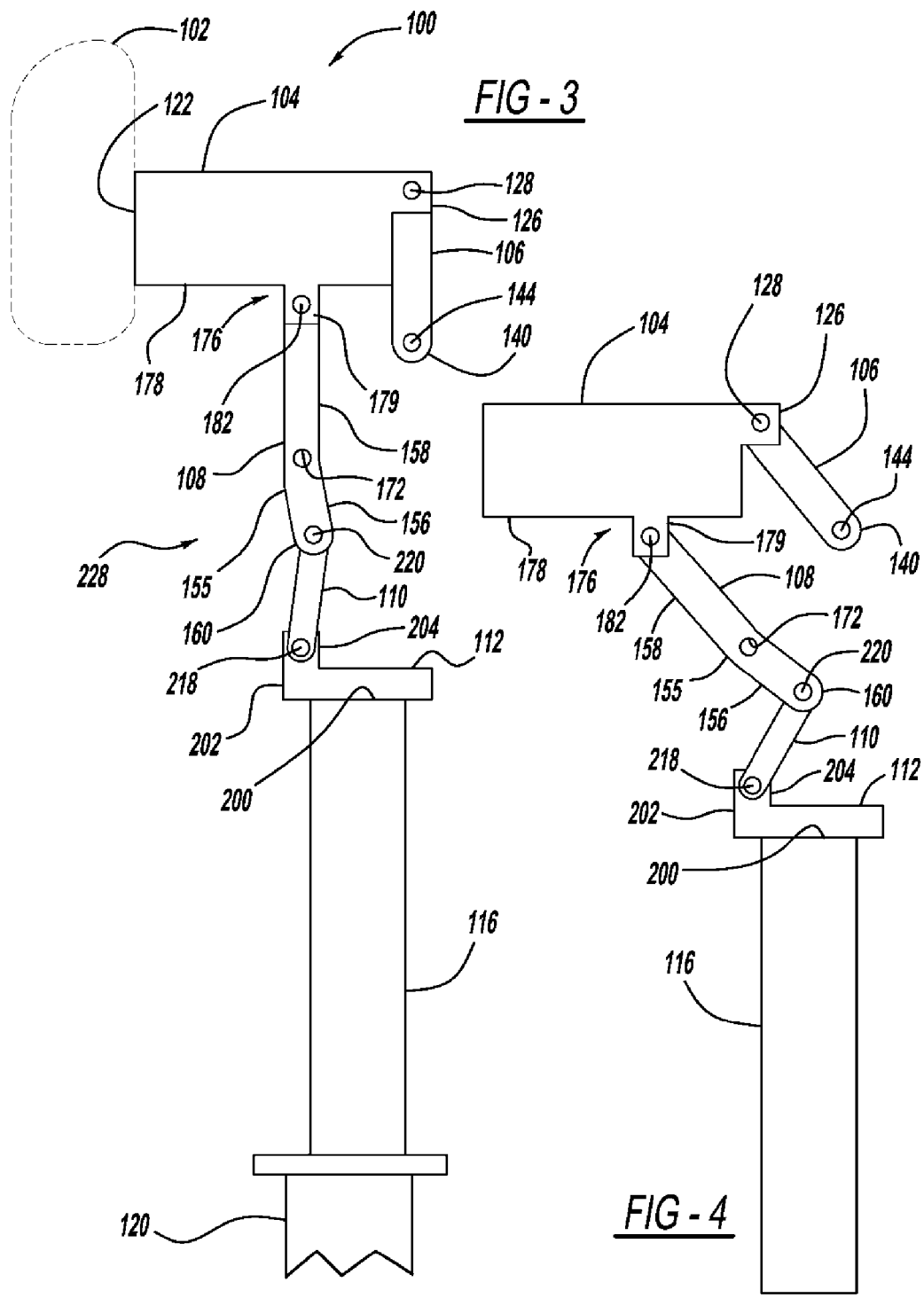

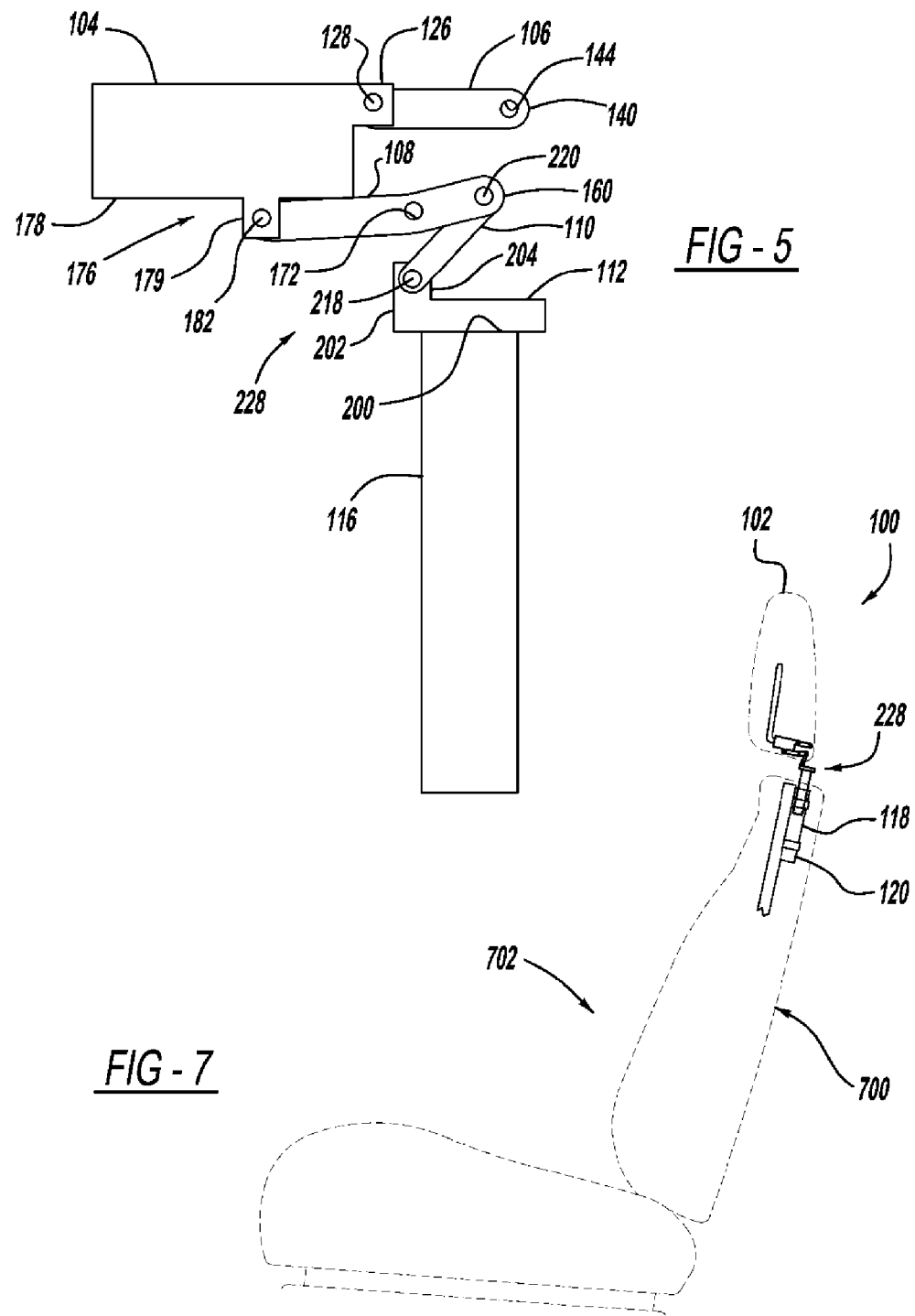

REAR VEHICLE SEAT AUTOMATIC HEAD REST SYSTEM

CROSS-REFERENCE TO RELATED APPLICATIONS

This application claims the benefit of U.S. provisional Ser. No. 61/476,459, filed Apr. 18, 2011.

FIELD

The present disclosure relates to head rest systems, and more particularly, to an automatically extendible and retractable head rest system for a rear vehicle seat.

BACKGROUND

This section provides background information related to the present disclosure which is not necessarily prior art.

Rear vehicle seats have head rest systems that provide support for the heads of passengers seated in the rear vehicle seats. Such head rest systems have been manually extendible and retractable. More recently, such head rest systems have been automatically extendible and retractable, such as the head rest system disclosed in U.S. Pat. No. 7,145,263 for "Automatic Headrest Adjustment Control System for a Vehicle Seat Assembly." In such automatic head rest systems, the head rest system is extended when a passenger is detected as seated in the vehicle seat and retracted when it is detected that the vehicle seat is vacant.

One problem with automatic head rest systems is packaging them to fit in the back reset of the vehicle seat. It is therefore an object of the present disclosure to provide an automatic head rest system that is compact and more easily packaged in a back rest of a vehicle seat.

SUMMARY

This section provides a general summary of the disclosure, and is not a comprehensive disclosure of its full scope or all of its features.

An extendible and retractable head rest system for a motor vehicle seat has a head rest coupled to a linkage and an actuator coupled to the linkage. The linkage includes an offset drive link that upon the actuator being actuated to extend the head rest system to an operative position, the linkage moves the head rest up and forward and upon the actuator being actuated to retract the head rest system to an inoperative position, the linkage moves the head rest back and down. In an aspect, the linkage kneels when the head rest reaches an upper position to move the head rest to a forward position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a side schematic view of the automatic head rest system of FIGS. 1 and 2 showing a linkage of the automatic head rest system in a retracted position;

FIG. 4 is a side schematic view of the automatic head rest system of FIGS. 1 and 2 showing a linkage of the automatic head rest system in a partially extended position;

FIG. 5 is a side schematic view of the automatic head rest system of FIGS. 1 and 2 showing a linkage of the automatic head rest system in an extended position;

FIG. 7 is a perspective view showing the automatic head rest system of FIGS. 1 and 2 packaged in a back rest of a vehicle seat and in the extended position.

Corresponding reference numerals indicate corresponding parts throughout the several views of the drawings.

DETAILED DESCRIPTION

The following description of the preferred embodiment(s) is merely exemplary in nature and is in no way intended to limit the invention, its application, or uses.

Figure 6:
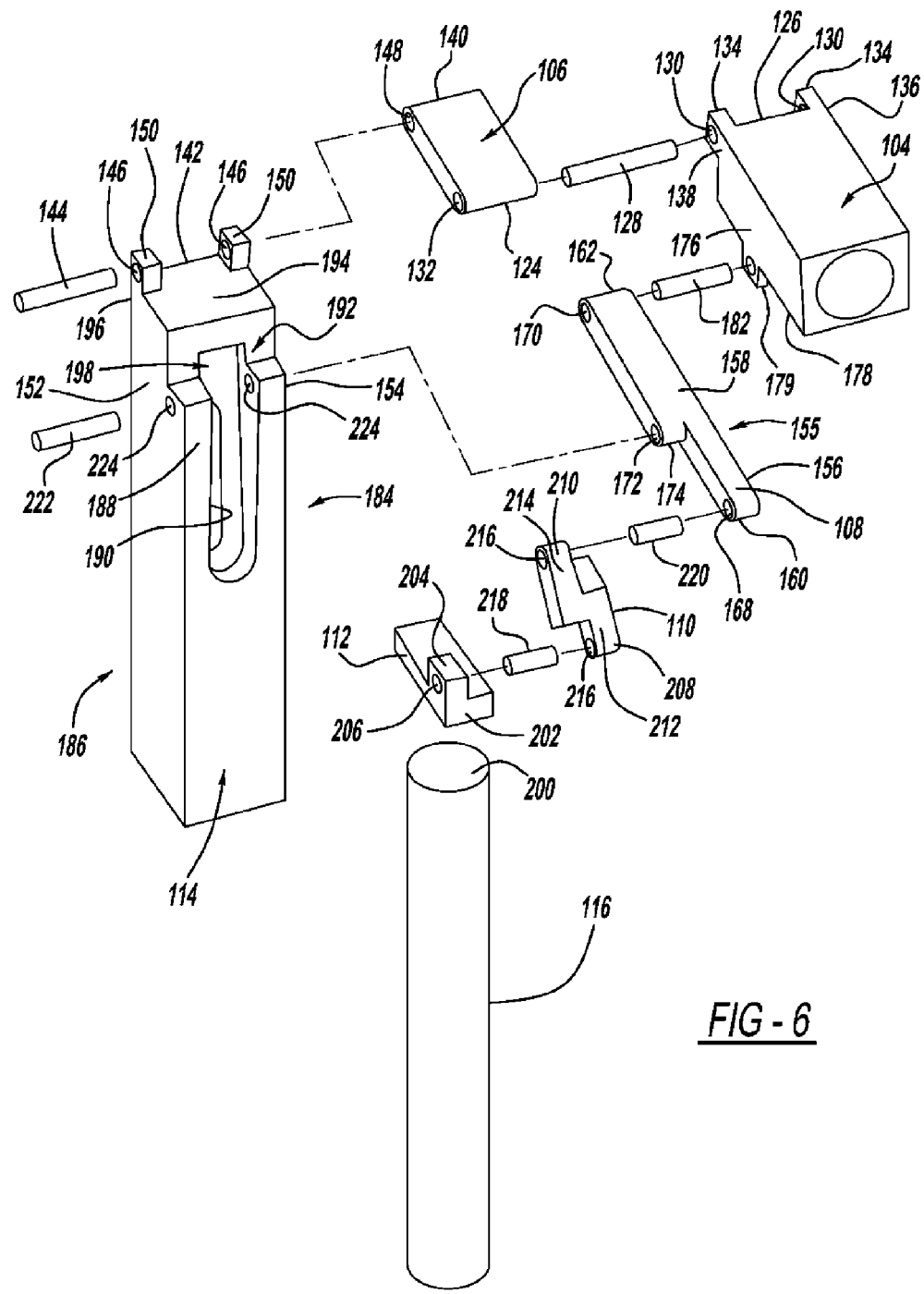
FIG. 6 is an exploded assembly view of the automatic head rest system of FIGS. 1 and 2.

With reference to FIGS. 1-7, an automatically extendible and retractable head rest system 100 in accordance with the above aspect of the present disclosure is described. Head rest system 100 includes a head rest 102 (FIGS. 3 and 7), a top link 104, a back link 106, a front link 108, an inner link 110, a drive link 112, a slider 114, a drive rod 116, a sleeve 118 (FIGS. 2 and 7) and an actuator 120. As shown in FIG. 3, head rest 102 is coupled to a front 122 of top link 104. As best shown in FIG. 6, back link 106 includes opposed ends 124, 140. End 124 of back link 106 is rotatably coupled to an upper back end 126 of top link 104, such as by a pin 128 that is journaled in holes 130, 132 that extend transversely through the upper back end 126 of top link 104 and end 124 of back link 106. In this regard, upper back end 126 of top link 104 in the illustrative embodiment has opposed ears 134 that project rearwardly on opposed sides 136, 138 of top link 104 at upper back end 126 which have opposed holes 130 therein. End 124 of back link 106 is received between opposed ears 134 and pin 128 inserted through holes 130 in ears 134 and hole 132 in end 124 of back link 106 to rotatably couple end 124 of back link 106 and upper back end 126 of top link together.

As best shown in FIG. 6, end 140 of back link 106 is rotatably coupled to a rear, upper end 142 of slider 114, such as by a pin 144 that is journaled in holes 146, 148 in upper end 142 of slider 114 and end 140 of back link 106, respectively. In this regard, rear, upper end 142 of slider 114 in the illustrative embodiment has ears 150 that project upwardly from opposed sides 152, 154 of slider 114 which each has a hole 146 therein. End 140 of back link 106 is received between opposed ears 150 and pin 144 inserted through holes 146 in ears 150 and hole 148 in end 140 of back link 106 to rotatably couple end 140 of back link 106 and rear, upper end 142 of slider 114.

Figures 1, 2:
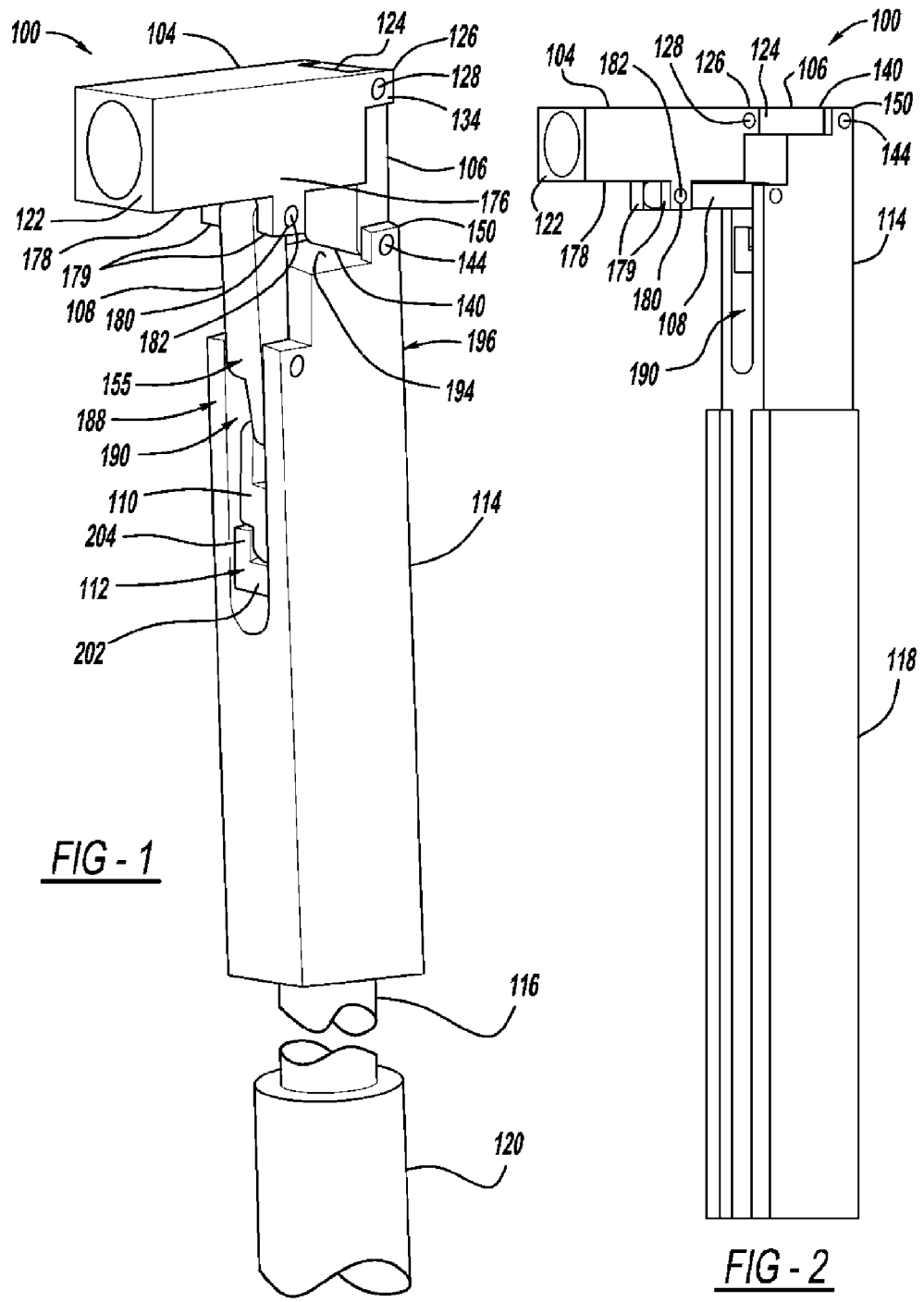
FIG. 1 is a side perspective view of an automatic head rest system in accordance with an aspect of the present disclosure in a retracted position.
FIG. 2 is a side perspective view of the automatic head rest system of FIG. 1 in an extended position.

As shown in FIG. 1, a mid-section 155 of front link 108 is rotatably coupled to slider 114. In this regard, as best shown in FIG. 6, front link 108 includes a narrower section 156, a wider section 158, and opposed ends 160, 162, with opposed end 160 also an end of narrower section 156 and the other opposed end 162 also an end of wider section 158. A hole 168 extends transversely through end 160 of front link 108 and a hole 170 extends transversely through end 162 of front link 108. A hole 172 extends transversely through an end 174 of wider section 158 where it meets narrower section 156.

End 162 of front link 108 is rotatably coupled to top link 104 at generally a middle 176 of a bottom 178 of top link 104. In the illustrative embodiment, top link 104 has opposed ears 179 extending downwardly with holes 180 (only one of which is shown) extending transversely therethrough. End 162 of front link 108 is received between ears 179 and a pin 182 is journaled in holes 180 in ears 179 and in hole 170 in end 162 to rotatably couple end 162 of front link 108 to the bottom 178 of top link 104 at generally the middle 176 thereof. It should be understood that the point where end 162 of front link 108 is rotatably coupled to the bottom 178 of top link 104 need not be in the exact middle of top link 104, but can be offset from the exact middle in either direction and as shown in the illustrative embodiment, is rearward of the middle of top link 104.

Slider 114 is hollow, illustratively having a rectangular outer cross-section. An upper portion 184 illustratively has a rectangular inner-cross section and a lower portion 186 illustratively has a cylindrical inner-cross section having approximately the same inner diameter as an outer diameter of drive rod 116, which is received in slider 114 for reciprocating movement therein as discussed in more detail below.

An upper front portion 188 of slider 114 has an elongated vertical slot 190 (FIGS. 1, 2 and 6) therein, illustratively an elongated U-shaped slot. Upper portion 184 of slider 114 is stepped, such that a top 192 of upper front portion 188 is lower than a top 194 of an upper back portion 196 forming a recess 198 thereat.

Drive link 112 is attached to a top 200 of drive rod 116 with a forward offset end 202 of drive link 112 projecting into slot 190 in upper front portion 188 of slider 114 when drive rod 116 is received in slider 114. Drive link 112 has an ear 204 projecting upwardly from the forward offset end 202 of drive link 112. Ear 204 has a hole 206 extending transversely therethrough.

Inner link 110 has ears 208, 210 projecting from opposed lower and upper ends 212, 214, respectively. Each of ears 208, 212 has a hole 216 extending transversely therethrough.

Opposed ends 212, 214 of inner link 110 are rotatably coupled to drive link 112 and to end 160 of front link 108, respectively. Lower end 212 of inner link 110 is rotatably coupled to drive link 112 by a pin 218 that is journaled in hole 206 in ear 204 of drive link 112 and hole 216 in ear 208 of inner link 110. Upper end 214 of inner link 110 is rotatably coupled to end 160 of front link 108 by a pin 220 that is journaled in hole 168 in end 160 of front link 108.

Front link 108 is received in elongated slot 190 in upper front portion 188 of slider 114 and rotatably coupled to slider 114 by a pin 222 that is journaled in hole 172 in front link 108 where the wider section 158 meets narrower section 156 and in holes 224 that extend transversely through upper front portion 188 of slider 114 adjacent top 192 thereof on opposed sides of elongated slot 190.

Slider 114 is received in sleeve 118 for reciprocal movement therein. Drive rod 116 is coupled to an actuator 120, which may be a linear actuator, a driven lead screw, or other mechanism that provides motive force to drive rod 116 to reciprocate it in slider 114, and thus reciprocate slider 114 in sleeve 118.

Top link 104, back link 106, front link 108, inner link 110 and drive link 112 comprise a linkage 228 (FIGS. 3-5) coupling head rest 102 to slider 114. When head rest system 100 is in the retracted position, shown in FIGS. 1 and 3, front link 108 angles downwardly and rearwardly from top link 104 into slider 114 and inner link 110 angles upwardly and rearwardly from drive link 112 into slider 114 where upper end 214 of inner link 110 is rotatably coupled to end 160 of front link 108. Drive link 112, with front 202 and ear 204 disposed in elongated slot 190 in upper front portion 188 of slider 114 provides an off-set drive link that, in conjunction with the rest of linkage 228, causes head rest 102 to "kneel" forward (such as by folding together) when it reaches it upper position as discussed below.

Actuator 120 and sleeve 118 are disposed in a back rest 700 of a vehicle seat 702 (FIG. 7). In operation, when head rest system 100 is deployed to its operative position such as when a passenger is seated in the vehicle seat, head rest 102 is moved upwardly and forwardly. Illustratively, head rest 102 is first moved to an upper position and then moved forwardly. Actuator 120 drives drive rod 116 to articulate upwardly in slider 114, moving slider 114 upwardly. When slider 114 reaches the upper position (which is the upper position of head rest 102), drive rod 116 continues to move upwardly in slider 114 moving offset drive link 112 upwardly. This action of offset drive link 112 transmitted via inner link 110 to end 160 of front link 108 causes front link 108 to rotate about pin 222 journaled at the top 192 of upper front portion 188 of slider 114, moving end 162 of front link 108 forward. This moves top link 104 forward moving head rest 102 to its forward position (FIGS. 2 and 5). When head rest system is deployed to its inoperative position, such as when the vehicle seat is vacant, the above sequence is reversed.

In an illustrative embodiment, head rest system 100 is automatically deployed to its operative position when a passenger is seated in the vehicle seat and the ignition switch turned on (if it is not already in its operative position. It is also automatically deployed to its retracted position when the ignition switch is turned on and the vehicle seat is vacant if it is not already in its retracted position. In this regard, an occupant sensor is included in the vehicle seat and used by a controller, such as the body controller of the vehicle, to determine whether to deploy the head restraint system to its operative or retracted position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An extendible and retractable head rest system for a motor vehicle seat, comprising:
   a head rest coupled to a linkage;
   an actuator coupled to the linkage;
   the linkage including an offset drive link that upon the actuator being actuated to extend the head rest system to an operative position, the linkage moves the head rest up and forward, and upon the actuator being actuated to retract the head rest system to an inoperative position, the linkage moves the head rest back and down;
   a sleeve disposed in a seat back of the vehicle seat;
   a hollow slider disposed in the sleeve for reciprocal movement therein;
   a drive rod coupled to the actuator and having an end to which the offset drive link of the linkage is attached, the drive rod received in the sleeve for reciprocal movement therein;
   the linkage having an inner link having upper and lower opposed ends, a front link having opposed ends, a top link having front and back opposed ends, and a back link having opposed ends;
   a mid section of the front link rotatably coupled to the slider;
   the offset drive link having a forward offset end that is forwardly offset from where the front link is rotatably coupled to the slider, the lower opposed end of the inner link rotatably coupled to the forward offset end of the offset drive link and the upper opposed end of the inner link rotatably coupled to one of the opposed ends of the front link such that the inner link extends upwardly from the offset drive link and inwardly into the slider;

the top link extending horizontally and the other opposed end of the front link rotatably coupled to a mid section of the top link, the head rest coupled to a front end of the top link; and one of the opposed ends of the back link rotatably coupled to the back opposed end of the top link and the other opposed end of the back link rotatably coupled to a rear, upper end of the slider.

2. The system of claim 1 wherein an upper front portion of the slider includes an elongated vertical slot in which the forward offset end of the offset drive link is disposed, the mid section of the front link received in the slot and coupled to the slider at an upper end of the slot.

3. The system of claim 1 wherein the front link includes a wider section and a narrower section, the front link rotatably coupled to the slider by the wider section being rotatably coupled to the slider at a point adjacent where the wider section meets the narrower section.

4. The system of claim 3 wherein when the head rest is moved to its operative position, the actuator drives the drive rod upwardly moving the slider upwardly and when the head rest reaches an upper position, the drive rod continues to move upwardly moving the offset drive link upwardly, the upward movement of the offset drive link being transmitted via the inner link to one of the opposed ends of the front link causing the front link to rotate about where it is rotatably coupled to the slider moving the other opposed end of the front link forwardly moving the top link forwardly to move the head rest forwardly.

5. The system of claim 4 wherein the linkage kneels when the head rest reaches an upper position to move the head rest to a forward position.

6. The system of claim 5 wherein the sleeve is disposed in a seat back of a vehicle seat.

\* \* \* \* \*